United States Patent [19]

Sanders et al.

[11] 4,101,930
[45] Jul. 18, 1978

[54] TELEVISION PICTURE WIPING

[75] Inventors: Richard Norman Sanders, Chesham; William James Crossley, Maidenhead, both of England

[73] Assignee: Prowest Electronics Limited, Windsor, England

[21] Appl. No.: 745,687

[22] Filed: Nov. 29, 1976

[30] Foreign Application Priority Data

Dec. 1, 1975 [GB] United Kingdom ............... 49230/75

[51] Int. Cl.² ............................................. H04N 5/22
[52] U.S. Cl. ................................................ 358/183
[58] Field of Search ........................................ 358/183

[56] References Cited

U.S. PATENT DOCUMENTS

| | | |
|---|---|---|
| 3,580,993 | 5/1971 | Sandorf et al. ....................... 358/183 |
| 3,736,377 | 5/1973 | Warren, Jr. et al. ................. 358/183 |
| 3,825,674 | 7/1974 | Justice ............................... 358/183 X |
| 3,891,792 | 6/1975 | Kimura .............................. 358/183 X |
| 3,958,232 | 5/1976 | Hobrough et al. ................. 358/183 X |
| 4,011,401 | 3/1977 | Presti ..................................... 358/183 |

Primary Examiner—Richard Murray
Attorney, Agent, or Firm—Fleit & Jacobson

[57] ABSTRACT

A television picture wiping arrangement is disclosed, in which the picture is notionally divided into a plurality of portions and a storage means, such as a matrix store, is provided having a storage address corresponding to each portion. Switching information relating to a sequence of picture content replacement for the portions, usually one portion at a time, is loaded into the storage means, and the information is scanned to generate a switching signal which effects the desired replacement sequence.

11 Claims, 7 Drawing Figures

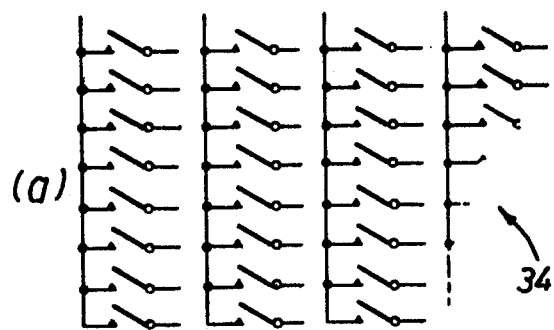
(a)
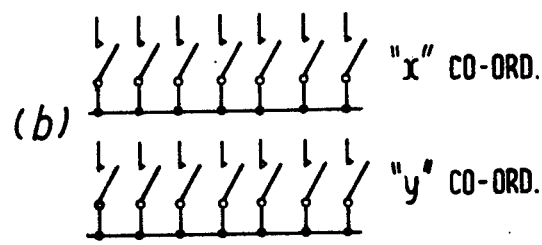
(b) "x" CO-ORD.
"y" CO-ORD.
FIG. 7
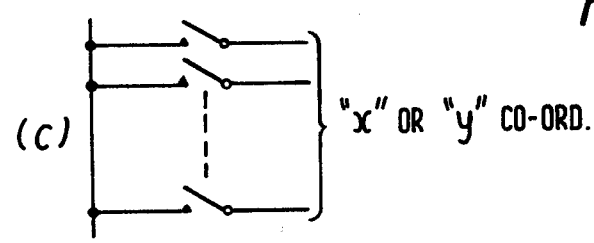
(c) "x" OR "y" CO-ORD.
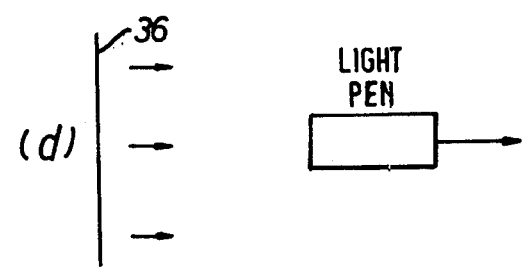
(d)

TELEVISION PICTURE WIPING

The present invention relates to the transmission of a television picture.

In television transmission it is frequently desirable to be able to replace all or part of a transmitted picture by fresh picture information at such a speed that an observer can watch the replacement occurring. This technique of picture replacement will be hereinafter referred to as "wiping", and the sequence in which the respective parts of a picture are replaced will be referred to as the "wipe pattern".

It has previously been proposed to replace a picture by means of linear wipe patterns which are continuous or smooth in the horizontal and vertical directions, and it is an aim of the invention to provide an arrangement by means of which wiping can be effected in any one of a plurality of preselected wipe patterns which may be linear or non-linear.

According to the invention there is provided a television arrangement comprising storage means having an address corresponding to each of a plurality of substantially non-overlapping portions notionally delineated on a television picture area, means for loading switching information into said addresses and scanning means for scanning the stored switching information to derive therefrom a switching signal, which indicates from which of a plurality of simultaneously available television pictures the content of each of said portions should be derived.

It will be appreciated that the effect of wiping, as defined above, is to gradually replace all or part of one television picture by another. Thus sources of the two television pictures are required, and it is convenient to merge these pictures by way of a selector circuit which is controlled by suitable switching signals, the generation of which will be described in more detail hereinafter, to progressively replace all or part of one picture by the other. The replacement, or wiping pattern is determined by the said switching signals.

In one example of the invention, a storage means is loaded with switching information in a sequence corresponding to the desired wipe pattern, and the stored information is scanned at television scanning rates to generate the aforementioned switching signals. In another example of the invention, the storage means is loaded linearly with the switching information and the stored information is scanned in a sequence corresponding to the required wipe pattern so as to generate said switching signals.

The storage means may be, for example, a two-dimensional matrix store or a shift register. The loading can be effected under the control either of one of a number of fixed programmes, which can be entered and selected as required, or a programme which can be varied as required. If a matrix store is used, the information stored therein may be scanned by means of a scanning generator which is controlled by a variable speed clock pulse generator which itself is controlled by a television synchronising signal.

In one example of the invention the storage means may comprise a "serial in-parallel out" shift register, the information stored in which is scanned by a scanning matrix in a sequence corresponding to the desired wipe pattern.

In order that the invention may be clearly understood and readily carried into effect, embodiments thereof will now be described, by way of example only, with reference to the accompanying drawings in which:-

FIG. 7 shows four different methods of loading switching information into the storage means.

Figure 1:
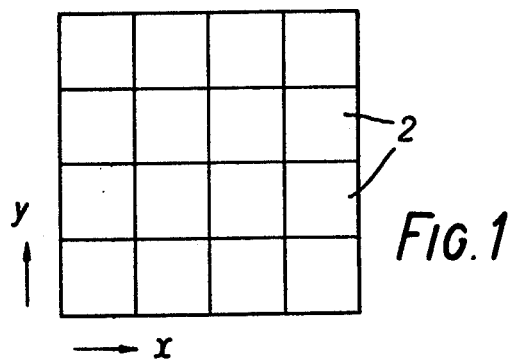
FIG. 1 represents notionally a television picture area sub-divided into portions.

The television picture area is notionally divided as shown in FIG. 1, into a number of portions 2 the centres of the portions 2 having respective $x$ and $y$ co-ordinates. Typically, sixty four portions 2 of equal area are used; each portion being sub-divided into four equal sub-portions. For the time being, however, the sub-portions will be ignored. In accordance with this example of the invention, the picutre content of these portions 2 can be replaced in any desired sequence, thereby producing a desired wipe pattern. The total number of possible different portion replacement sequences (ignoring the sub-portions) is the factorial number of the total number of portions 2. It will therefore be appreciated that there are a large number of possible replacement sequences.

To change the content of the picture, or a part of the picture, a switching signal is produced to change the picture content of the portions in the sequence of the required wipe pattern. It is usual to change the picture content of one portion during one field of the television scan; the change instruction being given during the preceding field blanking period. For slower replacement, the rate of change may be reduced to one portion in every second field period. If desired, multiple transition combinations may be used to produce different visual effects.

Figure 2:
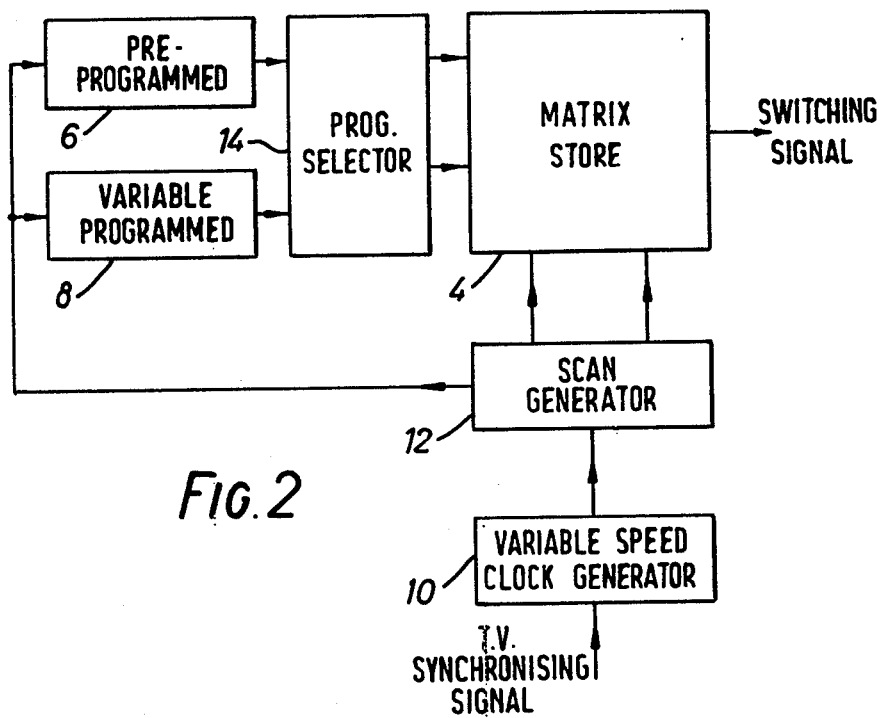
FIG. 2 shows, in block diagrammatic form, one example of the invention using a matrix store scanned by a scanning generator.

Referring to FIG. 2, one example of the invention includes a storage means, in the form of a matrix store 4, containing a number of addresses, in which each address corresponds to a respective one of the picture portions 2. The matrix store 4 is loaded under the control of a suitable programme of switching information from one or the other of two programmer circuits 6 and 8. The loading control programme is effective to deposit the switching information amongst the addresses in a desired sequence corresponding to a required picture wipe pattern. Conveniently, the deposited switching information consists of binary '1' and '0' signals; the binary '1' indicating that portions corresponding to addresses at which that value is stored should be derived from one of the two television pictures and the binary '0' indicating similarly that portions corresponding to addresses at which that value is stored should be derived from the other of said television pictures. The programmer circuit 6 contains a prepared programme (i.e. a fixed or non-variable programme). Several fixed programmes can be loaded into the programmer circuit 6, depending upon its capacity and any one of these fixed programmes can be selected as required. In one practical embodiment of the invention, eight such fixed programmes are provided. The programmer circuit 8 contains, for example, an array of sixty four switches by means of which a programme can be set up as required to deposit switching information in any desired address sequence in the matrix store 4.

A television synchronising signal, derived from the circuits used in generating the two television pictures in question, is applied to a variable speed clock pulse generator 10. The generator 10 controls a scanning waveform generator 12 which supplies address signals to the programmer circuits 6 and 8 and interrogates the addresses of the matrix store 4. These address signals initiate the loading of the matrix store 4 from either of the programmer circuits 6 and 8 during non-active television picture time (e.g. field flyback periods), and the scanning of the matrix store 4 during active picture time. The matrix store 4 is scanned, by the scanning waveform generator 12, at the television picture rate, starting at the top left-hand corner and working through to the bottom right-hand corner so as to liberate the aforementioned switching signal. A programme selector 14 is used to select which of the programmer circuits 6 and 8 are used to load the switching information into the matrix store 4 at any given time.

It will be appreciated that the scanning of the matrix store 4 produces a switching signal which determines the picture content displayed at each portion 2 when its corresponding matrix address is being scanned. As the switching information has been deposited in the matrix store at addresses arranged in a sequence corresponding to the required picture wipe pattern, this switching signal changes the picture content of the picture portions 2 in the sequence of the required wipe pattern.

Assuming that the variable programmer circuit 8 is to be used, the sequence of events occurring during a wipe is as follows. Initially, the addresses of the matrix store all contain binary '0' signals and thus the transmitted television picture is only derived from one of the two sources. The wipe pattern or sequence in which the portions are to be changed, is determined by sequential operation of the switches in the aforementioned array. This sequence is held in a buffer store and the circuit operation is such that, during the next field blanking period, the address of the first portion is applied to the matrix store 4, causing a binary '1' signal to be stored at the relevant address. During the subsequent field scanning period the switching signal developed by sequential interrogation (or scanning) of the addresses of matrix store 4 is such as to cause the transmitted picture to be derived from said one source for the major part of the picture, but from the other source while the relevant portion is scanned. During the next field blanking period, the next address in the sequence is caused to store a binary '1' value so that, during the following field scanning period, two portions of the picture are derived from said other source and the remaining 62 portions from said one source. This process continues until the programme, set up by actuation of the array of switches and held in the aforementioned buffer store, has been completed. It is not necessary for the whole of one picture to be replaced by another. For example only 32 of the switches may be actuated so as to cause, after the programme has been executed, one half of the transmitted picture to be derived from one picture source and the other half to be derived from the other source.

Figure 3:
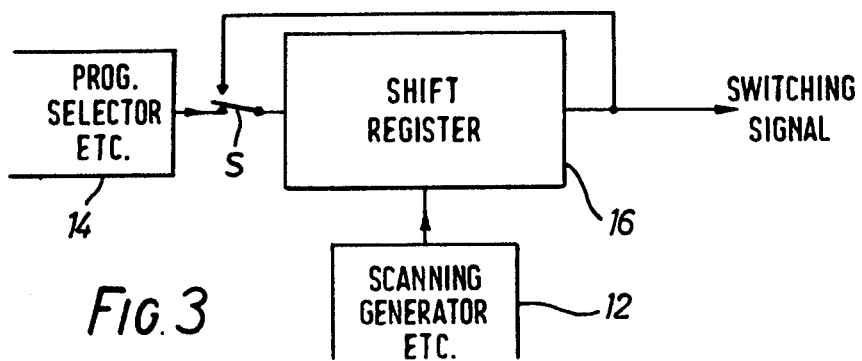
FIG. 3 shows, in block diagrammatic form, part of another example of the invention employing a shift register instead of a matrix store.

Referring to FIG. 3, in another example of the invention, the matrix store 4 is replaced by a shift register 16 having capacity to store as many bits as the number of matrix elements of the matrix store 4, i.e. sixty four in this example. The apparatus of FIG. 3 includes all the components of the apparatus of FIG. 2 except for the matrix store 4.

In operation, the scanning waveform generator 12 supplies address signals to the programmer circuits 6 and 8 and to the shift register 16. The address signals initiate the loading of the shift register 16 from one or other of the programmer circuits 6 and 8 during non-active picture time, and the recirculating of the shift register 16 during active picture time. This recirculating of the shift register 16 is effected by way of a conventional switch arrangement S and is equivalent to the aforementioned scanning of the matrix store 4.

Figure 4:
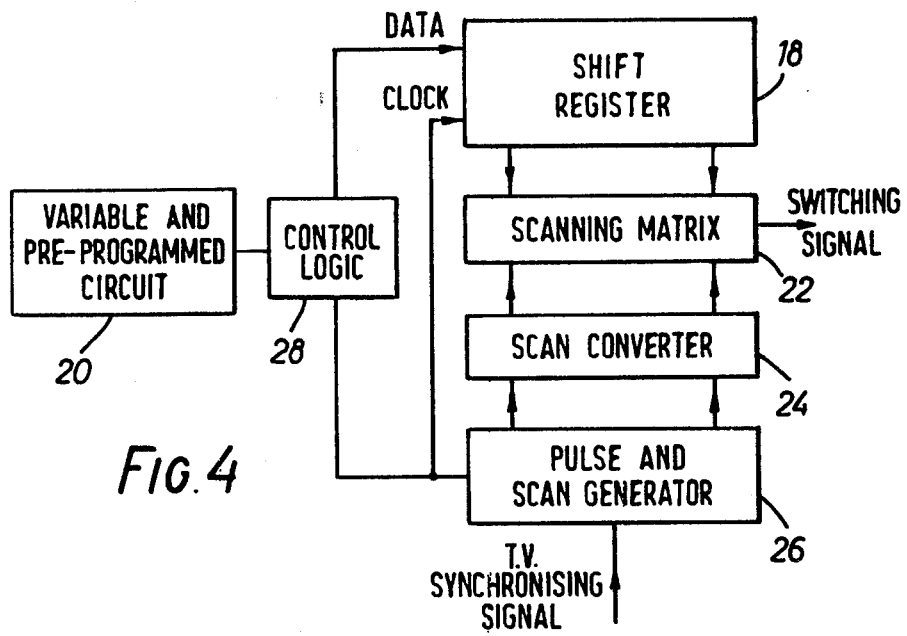
FIG. 4 is a block schematic diagram of another example of the invention employing a "serial in-parallel out" shift register as a memory.

Referring to FIG. 4, another example of the invention includes an N-bit "serial in-parallel out" shift register 18 which is initially empty (i.e. contains sixty four '0' values) and is sequentially loaded with '1' values from a programmer circuit 20 in a linear manner at a speed determined by the operator. The shift register 18 is clocked at a multiple of the television field repetition rate and '1' values are advanced through the shift register such that the parallel output is gradually changed from all '0' values to all '1' values to provide signals for scanning by an N-bit scanning matrix 22 of conventional form to provide the switching signal. The sequence in which the shift register bits is scanned is determined by a fixed or variable scan converter 24 which is fed with a linear scan waveform from a pulse generator 26 locked into the television system. This pulse generator 26 is fed with a variable or fixed programme from the programmer 20 via a control logic circuit 28.

It will be appreciated that in the apparatus of FIG. 4 the shift register 18 is loaded in a linear manner, and is then scanned in a particular sequence defined by the loaded programme from the programmer circuit 20. This of course is the converse of the apparatus of FIGS. 2 and 3.

Figure 5:
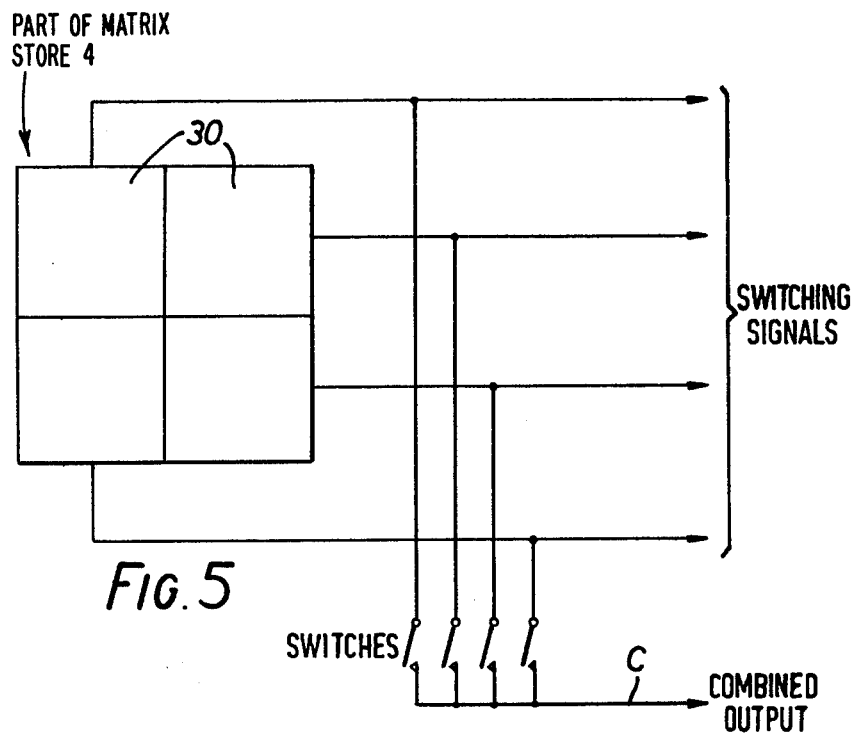
FIG. 5 is a diagram of part of another example of the invention in which each portion of the television picture is divided into four sub-portions.

Referrng to FIG. 5, and as previously mentioned, each portion of the picture may be divided into a number of sub-portions. Each sub-portion has a respective address 30 in the matrix store 4 and the sub-portion addresses can be interrogated in different sequences so that different wipe patterns can be produced in corresponding different portions of the television picture. In addition, this arrangement makes it possible to combine more than two picture sources into one picture; for example, with the arrangement of FIG. 5 up to four different pictures can be displayed on the television screen. In that case, four separate switching signals are produced, one for each sub-portion. If however, ony two pictures are to be combined, a single, common switching signal can be used, as shown achematically at C even if the wipe pattern sequence is different in the four sub-portions. The signal C is obtained by means of suitably switched connections to the individual output lines relating to the sub-portion addresses.

Figure 6:
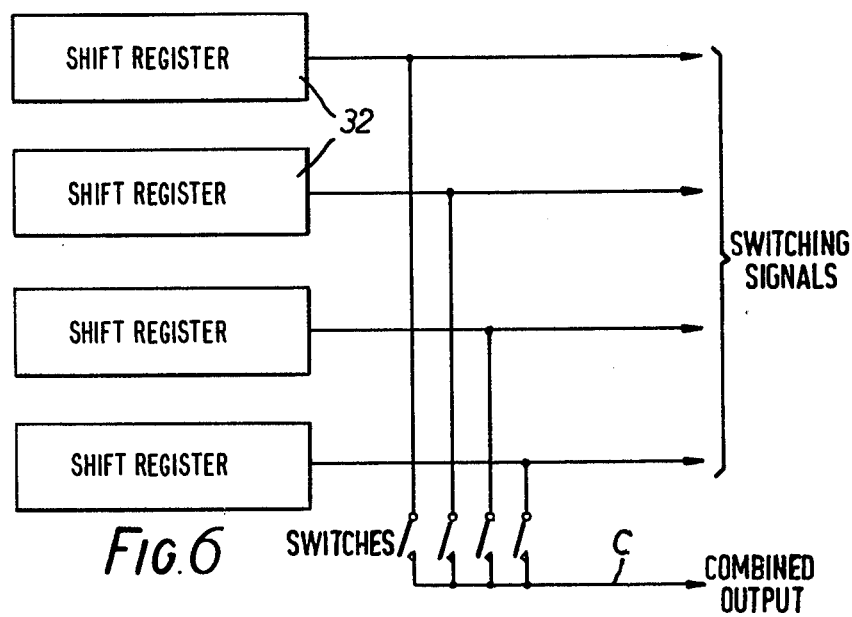
FIG. 6 illustrates a modification to the apparatus of FIG. 3 in which four separate shift registers are used as the memory.

FIG. 6 illustrates a modified apparatus using four shift registers 32, one for each sub-portion. The operation of the shift registers 32 is similar to that of the sub-portion addresses.

FIG. 7 illustrates four methods of manually loading a progamme into the matrix store 4, the first of which, as depicted schematically in FIG. 7(a) has already been described. In this case a matrix 34 of switches is used in which the total number of switches equals the total number of addresses in the matrix store 4, and the configuration of the addresses in the matrix store 4. As previously mentioned, the switches are operated in sequence to load the store 4 in a desired sequence corresponding to the required picture wipe pattern. To load a binary '1' in any address in the store 4, it is necessary to close the switch having the $x$ and $y$ co-ordinates corresponding to that address. For example, to load the address in the top left-hand corner position it is necessary to operate the switch having the co-ordinates $x = 1$ and $y = 1$.

FIG. 7(b) illustrates a system basically similar to that of FIG. 7(a) except that it utilises fewer switches. The system of FIG. 7(b) consists of a first row having a switch for each address in the $x$-direction, and a second row having a switch for each address in the $y$-direction. To load a binary '1' into any address in the store 4, it is necessary to close the two switches corresponding respectively to the $x$- and $y$-co-ordinates of that address.

FIG. 7(c) illustrates another switch system employing only ten switches, which represent the digits 0 to 9 and are sufficient, together with suitable electronic circuits of known kind, irrespective of the number of elements in the $X$- and $y$- direction. Firstly, a pair of the switches are operated in sequence to provide the digits of the $x$ co-ordinate of the required address then a second pair of switches (which in some cases may be the same as the first pair) are operated in sequence to provide the digits for the $y$ co-ordinate of the required address.

FIG. 7(d) illustrates an optical arrangement for loading the matrix store 4. The apparatus includes a screen 36 which may be constituted either by the screen of a cathode ray tube or by a screen containing a number of lamps equal to the number of matrix elements in the store 4, and having the same configuration as these matrix elements. If the screen is a cathode ray tube, it is scanned with a single eletron beam so that only one element is illuminated at a time, and if the screen is a lamp screen, the lamps are illuminated in sequence so that only one lamp is illuminated at one time. A light pen is held in front of a part of the screen having the $x$ and $y$ co-ordinates corresponding to the address of store 4 to be loaded. The light pen contains, in known manner, a light sensitive device which provides an electrical pulse when activated. It will be appreciated that the timing of the pulse will correspond to the instant that the corresponding part of the screen was illuminated. As the scanning of the screen is related to the positions of the addresses in the store 4, the time instant of the pulse will give the position of the appropriate address in the store 4. Therefore this pulse can operate suitable circuits to ensure that a binary '1' value is loaded into the appropriate address in the store 4.

What we claim is:

1. A television arrangement for receiving respective input television signals from each of a plurality of sources and providing output television signals, derived from at least one of said input signals, for display on a television picture area, said arrangement including storage means having a respective address for each of a plurality of substantially non-overlapping portions of said area, said storage means storing, at said addresses, switching information which indicates picture content replacement sequence in which the output television signals, previously derived from one of said sources and displayed on respective portions of said picture area, are to be derived from another of said sources, and scanning means for scanning said switching information to produce a switching signal adapted to selectively control, in accordance with said sequence, the derivation of said television output signals from said television input signals.

2. An arrangement according to claim 1 wherein said storage means comprises a two-dimensional matrix store.

3. An arrangement according to claim 1 wherein said storage means comprises a shift-register.

4. An arrangement according to claim 1 including a manually operable programmer circuit by means of which sequences of picture content replacement for said portions can be set up.

5. An arrangement according to claim 4 wherein said manually operable programmer unit includes an array of switches, one for each of said addresses.

6. An arrangement according to claim 4 wherein said addresses are arranged in a rectangular array of rows and columns and said manually operable programmer unit includes two banks of switches, one bank containing a switch for each row and the other bank containing a switch for each column.

7. An arrangement according to claim 4 wherein said manually operable programmer unit comprises ten switches each representing a respective one of the digits 0 to 9, and the said addresses are identified by number, the appropriate switches being operated in sequence to identify a respective address.

8. An arrangement according to claim 1 wherein said storage means comprises a "serial in-parallel out" shift register, the arrangement includes a loading means adapted to load said addresses linearly at a uniform rate, and the scanning means is arranged to interrogate said addresses in a desired sequence of picture content replacement for said portions.

9. An arrangement according to claim 1 wherein each of said portions is sub-divided into a plurality of sub-portions and an address is provided in said storage means for each sub-portion.

10. An arrangement according to claim 9 wherein respective switching signals are provided for each sub-portion.

11. An arrangement according to claim 1 including loading means for loading said switching information into said storage means, and wherein said loading means comprises a programmer circuit containing a plurality of different, pre-determined sequences of picture content replacement for said portions.

* * * * *